United States Patent Office 2,704,769
Patented Mar. 22, 1955

2,704,769

PREPARATION OF ALPHA-HYDROPERFLUORO-NITRILES

James D. La Zerte, St. Paul, Minn., assignor to Minnesota Mining & Manufacturing Company, St. Paul, Minn., a corporation of Delaware No Drawing. Application May 31, 1951,
Serial No. 229,269

2 Claims. (Cl. 260—465.7)

This invention relates to the preparation of alpha-hydroperfluoronitriles.

Heretofore compounds of this nature, namely, alpha-hydroperfluoronitriles, have been prepared by other methods. The most satisfactory prior method known to me has consisted of reacting a perfluoro olefin of three or more carbon atoms with an alcohol to form the corresponding ether, which later is then hydrolyzed to yield the corresponding ester. Such ester was then reacted with ammonia to form the corresponding amide with the elimination of alcohol. The amide, upon being subjected to a dehydration reaction, yields the corresponding alpha-hydroperfluoronitrile. Where the starting material in this prior reaction is perfluoropropene, the reactions just mentioned may be illustrated as follows:

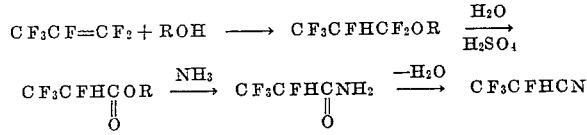

It will be seen that several steps are involved in producing an alpha-hydroperfluoronitrile by the method just indicated.

In accordance with my present invention, I have found that I can produce alpha-hydroperfluoronitriles much more simply and in good yields. I react a perfluoro olefin of three or more carbon atoms, having a terminal unsaturation, directly with ammonia, especially under conditions as hereinafter illustrated, whereupon HF immediately splits out of the reaction, combining with excess ammonia provided for that purpose, leaving the desired alpha-hydroperfluoronitrile product. Examples of such product are:

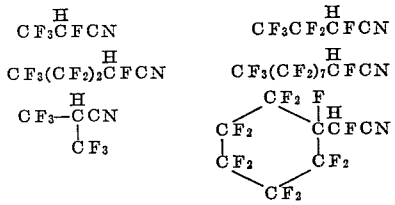

The following illustrates the reaction of my process for producing alpha-hydroperfluoronitriles:

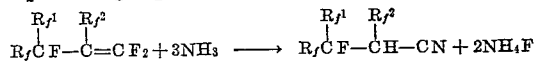

In the formulas just shown $R_f$, $R_f'$ and $R_f^2$ are fluorine or perfluoro-alkyl radicals, and they may be the same or different. The ammonia of the reaction may be employed as such or it may be derived from a compound which is capable of producing ammonia under the conditions of the reaction.

As an illustration of my process, using specific reactants, I may react together perfluoropropene and ammonia to yield the corresponding alpha-hydroperfluoropropionitrile, as follows:

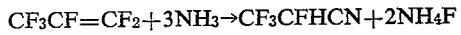

Comparable reactions will take place between ammonia and other perfluoro olefins having terminal unsaturations. The products of my reaction indicate that the ammonia reacts with the perfluoro olefin in such a way that two of the hydrogen atoms of the ammonia molecule react with the halogens connected to the terminal carbon atom, to eliminate the same as the hydro halide, while the nitrogen, in effect, joins to the terminal carbon atom, the remaining hydrogen adding to the carbon atom on the other side of the double bond.

It may be, although this is not more than mere theory, that in the reaction between a perfluoro olefin of three or more carbon atoms, having terminal unsaturation, with ammonia, there may instantaneously be formed a straight addition product, such as:

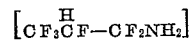

which would then immediately lose two molecules of HF, to yield alpha-hydroperfluoropropionitrile, viz.:

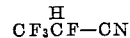

Particular methods of carrying out the reactions of this invention will now be illustrated by specific examples.

Example I

Perfluoropropene and ammonia, in a molar ratio of 4 to 1, were mixed together in the vapor phase, passed through a diffusion vessel, and then into a trap immersed in a mixture of Dry Ice (solid carbon dioxide) and acetone. The actual weight of the perfluoropropene employed was 208 grams, and the actual weight of the ammonia admixed therewith was 6 grams. The bulk of the reaction took place as the gases were being condensed in the trap. The purpose of the stoichiometric excess of the perfluoropropene was to minimize side reactions.

The condensate in the trap was allowed to warm to 0° C. At that temperature volatile gas was given off from the condensate. It consisted largely of unreacted perfluoropropene, i. e., $C_3F_6$, which was then mixed with additional ammonia (while still maintaining the molar ratio of perfluoropropene to ammonia of about 4 to 1) and recycled through the trap. This procedure was repeated for another three times. Each time the quantity of perfluoropropene was less than the previous time, but the molar ratio of perfluoropropene to ammonia was maintained at approximately 4 to 1 during each circulation or pass.

After the last cycle or pass, the volatile material was passed over phosphorus pentoxide to remove traces of ammonia. The total condensed product was then separated into two fractions by a one plate distillation. The lower boiling material had a molecular weight of 150; and infra-red analyses indicated it to be recovered perfluoropropene. The other fraction boiled at +42° C., had a molecular weight determined as 127 and was made up, according to an elementary analysis, to the extent of 60% of fluorine and 11% of nitrogen. This corresponds to a compound of the empirical formula $C_3F_4HN$ having 60.3% fluorine and 11.1% nitrogen, by theory. The infra-red spectra indicated the presence of nitrile, i. e., CN, and carbon-hydrogen, i. e. C—H absorption peaks at 2280 cm.$^{-1}$ and 2940 cm.$^{-1}$, respectively. This, together with the molecular weight and elemental analyses, show that this latter fraction was alpha-hydroperfluoropropionitrile, viz.:

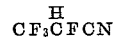

Example II

The process of Example I was repeated, with this difference: The perfluoropropene was replaced as a starting material by perfluorobutene-1. The reaction which was effected by employing this different starting material is shown by the following equation:

The product of the process, namely, alpha-hydroperfluorobutyronitrile, was identified by the same type of analysis as described in Example I.

Example III

The same starting materials were employed as in Example II. However, diethyl ether, as a solvent for the reactants, was here used. 65 g. (0.32 mol) of perfluorobutene-1 and 20 g. of diethyl ether were placed in a trap, cooled with a mixture of Dry Ice and acetone (as described in Example I hereof), and 5.5 g. (0.32 mol) of gaseous ammonia were added slowly as the trap was shaken. After the addition was completed, the condensable material was separated from the solid ammonium fluoride which had been formed. Then the unreacted products and the ether were separated from the higher boiling products of the reaction by distillation. A 20% yield of the alpha-hydroperfluoronitrile product, i. e., alpha-hydroperfluorobutyronitrile, was obtained in this single pass.

*Example IV*

In the same manner as described in Example III, 2.5 g. (0.15 mol) of ammonia was reacted with 28.5 g. (0.14 mol) of perfluoroisobutene in diethyl ether, as a solvent. An 85% yield was obtained of the nitrile product, that is, $(CF_3)_2CHCN$. This product had a boiling point of 64–64.5° C., a molecular weight of 175–177, a refractive index of 1.2750 at 25° C., and showed an elemental analysis as follows: 63.4% fluorine, 27.1% carbon and 7.9% nitrogen.
The reaction of this example is as follows:

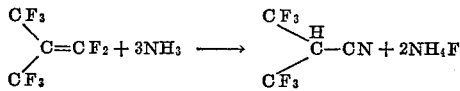

*Example V*

As an example of a reaction between a higher perfluoro olefin and ammonia, I carried out the following reaction: 0.021 mol of perfluorononene-1 and 0.07 mol of diethyl ether, the latter being a solvent, were cooled in a mixture of Dry Ice and acetone as above described. 0.028 mol of ammonia was then added as described in Example III. A yellow solid began forming as soon as the ammonia vapor was introduced. Analyses as above described indicated that the reaction product was the corresponding alpha-hydroperfluoronitrile. The reaction of this example is illustrated by the following equation:

As a result of my studies I have also found that alpha-hydroperfluoronitriles can be prepared, by a reaction between the corresponding perfluoro olefin of three or more carbon atoms and terminal unsaturation, and ammonia by other methods. I have conducted such reactions under pressure in an autoclave, or in vapor phase at elevated temperatures, as illustrated by the following examples:

*Example VI*

To a hydrogenation bomb was charged 80 grams (0.53 mol) of $C_3F_6$ and 20 grams (1.2 mols) of ammonia. The reactor was heated to 100° C. at which point a pressure of 420 pounds per square inch was obtained. Heating was continued for a period of five hours. The low boiling fraction from the rseulting product was found to contain $CF_3CFHCN$ as indicated by infra-red analysis.

*Example VII*

Sixty five and one-half grams (0.44 mole) as $C_3F_6$ and 5.0 grams (0.29 mole) of ammonia were passed over "Darco" activated carbon without external heating. A high heat of adsorption resulted, with all the material charged being held onto the carbon. The carbon was then heated to 400° C. and the resulting evolved products were caught in a liquid air trap. $CF_3CFHCN$ was found to be present, as determined by infra-red analysis.

Based upon my studies, the reactions of this invention can most advantageously be carried out in the liquid or condensed phase, with or without catalyst. The condensed phase may be due to the condensation of the reactants and/or to the presence of a mutual solvent, as illustrated above, or it may be due to the adsorption of the reactants to catalytic surfaces. In some cases, an excess of the perfluoro olefin itself acts as a diluent or a solvent, providing a liquid phase reaction and helping to avoid undesirable side reactions.

The above examples will illustrate how other perfluoro olefins having three or more carbon atoms and terminal unsaturation may be reacted with ammonia-yielding compounds, to produce the corresponding alpha-hydroperfluoronitriles.

The utility of alpha-hydroperfluoronitriles is believed to be understood in the art. However, as an example of one use of such compounds they can be employed as intermediates for the production, by dehydrofluorination, of the corresponding alpha-beta unsaturated perfluoronitriles. For example, this use may be illustrated by the following equation:

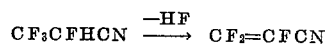

While hereinabove the reaction of my process has been illustrated by ammonia and compounds of the general formula:

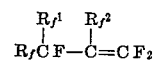

I also comprehend reactions of ammonia with such olefins as

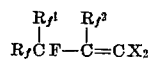

where X may be any halogen, more particularly, chlorine, bromine and fluorine, but especially fluorine. In the general formulae just shown above, the $R_f$, $R_f^1$ and $R_f^2$, as above indicated, are either fluorine or a perfluoroalkyl group.

The reaction of this invention, as has been indicated, calls for the use of a perfluoro olefin of three or more carbon atoms as a starting material, with a terminal olefinic linkage. Where a perfluoro olefin of only two carbon atoms is reacted with ammonia entirely different results have been experienced, as is indicated by published literature such as Rigby U. S. Patent No. 2,484,528, where it is indicated that tetrafluoroethylene and ammonia were reacted to give tris(difluoromethyl)triazine, which has the structural formula:

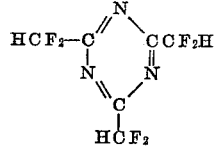

No one prior to my invention, insofar as I am aware, has ever reacted ammonia with a perfluoro olefin of three or more carbon atoms and terminal olefinic unsaturation. More especially, no one prior to my invention, to my knowledge, has ever reacted such materials so as to secure alpha-hydroperfloronitriles, as herein described.

Hereinabove, I have illustrated details on production and reactants in various particulars. This material is intended to be illustrative and not limiting. All variations and embodiments within the scope of the present specification or in the appended claims are comprehended.

What I claim is:

1. The process of producing an aliphatic halogenated nitrile having the formula

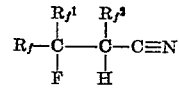

which comprises reacting together, in liquid phase, (a) anhydrous ammonia with (b) a perhalo mono-olefin having the formula

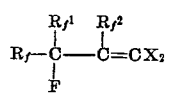

with elimination of hydrogen halide, and recovering the nitrile product, X being halogen, and $R_f$, $R_f^1$ and $R_f^2$ being selected from the class consisting of fluorine and perfluoroalkyl radicals.

2. The process of producing an aliphatic halogenated nitrile having the formula

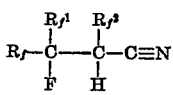

which comprises reacting together, in liquid phase and at a low temperature, (a) anhydrous ammonia with (b) a perfluoro mono-olefin having the formula
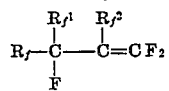
with elimination of hydrogen fluoride, the radials $R_f$, $R_f^1$ and $R_f^2$ being selected from the class consisting of fluorine and perfluoroalkyl radicals.
References Cited in the file of this patent
FOREIGN PATENTS
607,103    Great Britain ---------- Aug. 25, 1948